2 Sheets—Sheet 2.
E. F. STODDARD.
Spring-Hoe for Grain-Drills.
No. 198,319. Patented Dec. 18, 1877.
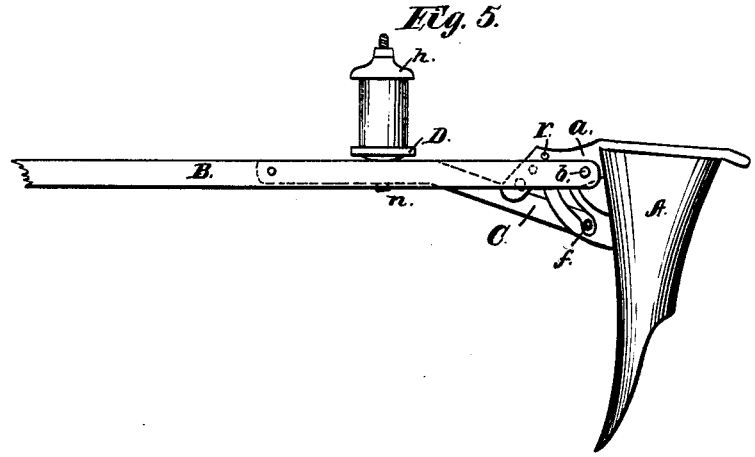
Fig. 5.
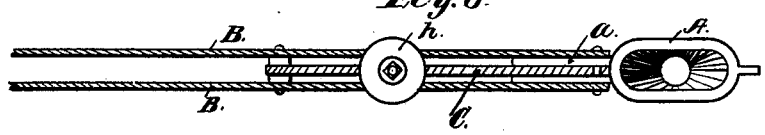
Fig. 6.
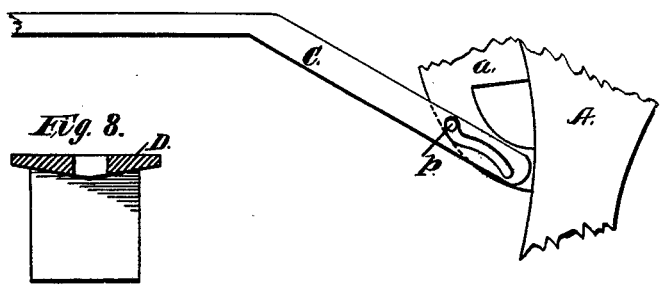
Fig. 7.
Fig. 8.
Witnesses:
Chas. M. Peck
P. H. Gunckel
Inventor:
E. Fowler Stoddard
by his Atty's
Peck & Ritchie

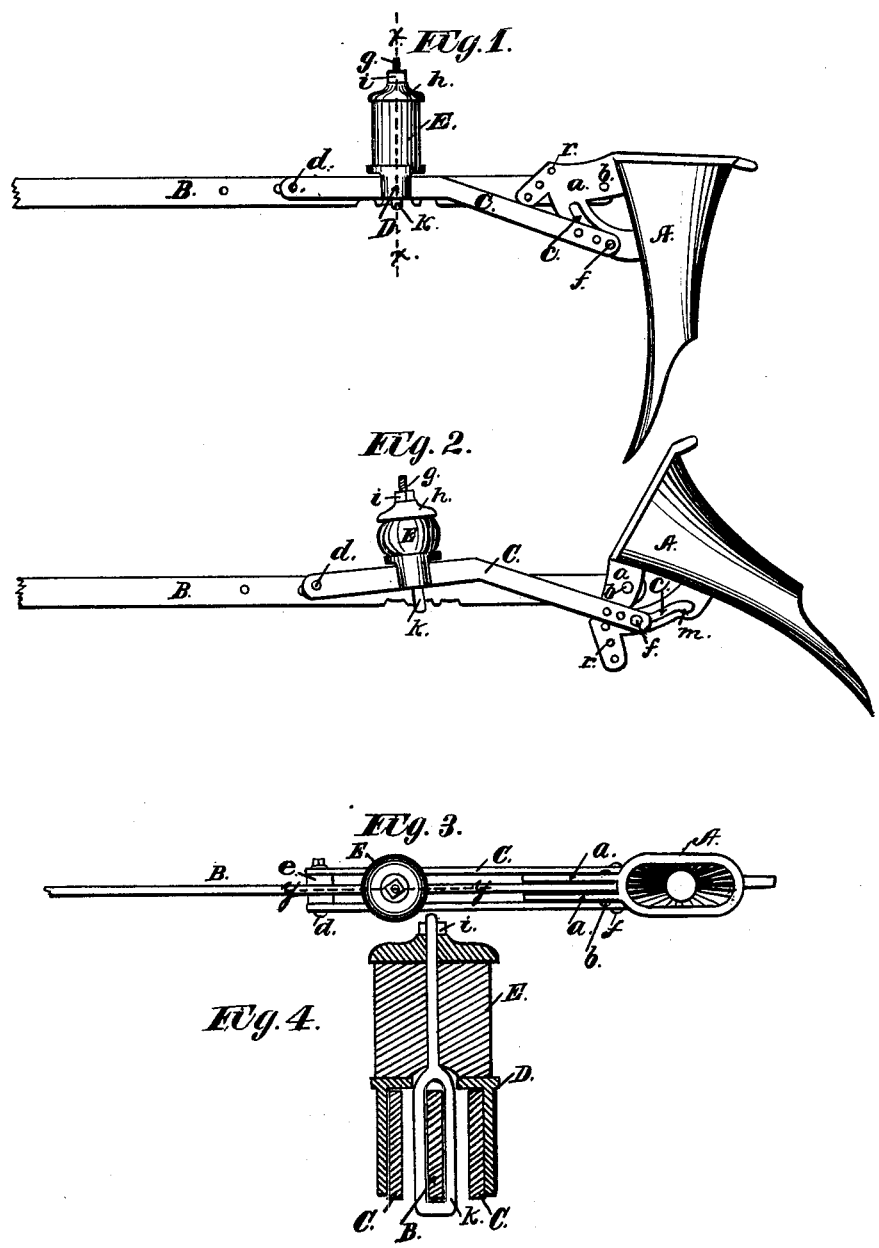

UNITED STATES PATENT OFFICE.

E. FOWLER STODDARD, OF DAYTON, OHIO.

IMPROVEMENT IN SPRING-HOES FOR GRAIN-DRILLS.

Specification forming part of Letters Patent No. 198,319, dated December 18, 1877; application filed October 29, 1877.

*To all whom it may concern:*

Be it known that I, E. FOWLER STODDARD, of Dayton, in the county of Montgomery and State of Ohio, have invented certain new and useful Improvements in Spring-Hoes for Grain-Drills; and I do hereby declare the following to be a full, clear, and exact description of the same.

This invention relates to that class of hoes for grain-drills or other seeding implements which are provided with springs and connecting-levers in the place of break-pins, to enable the hoe to yield in encountering obstructions which would ordinarily break the pins, and to reset itself when the obstacle has been passed.

My improvements consist in the novel construction and arrangement of the parts composing the device, whereby I combine both durability and simplicity, as will be herewith set forth.

In the accompanying drawings, Figure 1, Sheet 1, shows my improved spring-hoe in side elevation. Fig. 2, Sheet 1, is the same view, with the hoe-spring back, as in passing an obstacle. Fig. 3, Sheet 1, is a plan view of the device. Fig. 4, Sheet 1, is an enlarged sectional view through the line $x\,x$ of Fig. 1. Fig. 5, Sheet 2, is a modification of the device in side elevation. Fig. 6, Sheet 2, is a plan view of Fig. 5. Fig. 7, Sheet 2, is a detail view, to be referred to hereinafter. Fig. 8, Sheet 2, is a sectional view, in elevation, of the saddle-piece through the line $y\,y$ of Fig. 3.

From the upper front side of the hoe A project two similar parallel brackets, $a$, of the shape shown. Between them, at $b$, is pivoted the rear end of the drag-bar B, which is of the usual construction. Through the lower curved parts of the brackets $a$ are coincident segmental slots $c$, with recessed portions forming shoulders $m$, as in Figs. 2 and 5.

C C are two angular arms or flat metal bars, one upon each side of the drag-bar, to which they are pivoted at $d$, and from which they are separated by washers $e$, as is shown. The rear ends of these arms rest upon the outer sides of the brackets $a$, and are connected by a bolt, $f$, which passes through the slots $c$.

D represents a saddle-piece, consisting of a disk beveled on its under side, as seen in Fig. 8, and having two downward-projecting arms. This saddle-piece fits over the outer arms C, as shown, and forms the seat for the cylindrical rubber spring E, which is kept in place by a threaded axial rod, $g$, over which a compression-disk, $h$, fits and is adjusted by the nut $i$. The lower part of the rod $g$ terminates in a stirrup, $k$, which encompasses the drag-bar B, whose under side is notched or serrated to prevent the stirrup from slipping.

The action of the hoe may be described as follows: Its ordinary working position is shown in Fig. 1. When an obstacle is met, such as a stone or root, the strain upon the point causes the bolt $f$ to be jarred from the shoulders $m$ at the lower portion of the slots $c$, and the hoe then turns upon the pivot $b$. The segmental slots $c$ cause the arms C to be raised upon their pivot $d$, carrying with them the saddle D, and thus compressing the spring E. The hoe then assumes the position shown in Fig. 2. When the obstacle has been passed the reaction of the spring E causes the hoe to reset itself.

As will be seen, this arrangement of parts is very simple, and they can be adjusted to suit different kinds of soil.

It is to be specially noticed that the saddle-piece D is raised by the arms C, and, owing to the beveled edges on its under side and the freedom of the stirrup $k$, held from slipping by the serrations on the under side of the drag-bar, the whole spring always accommodates itself to the position of the arms C; that it maintains a position at right angles to them, so that the rubber is compressed equally on every side, and can exert its full elastic force, as shown in Fig. 2; and, further, that the whole spring can be shifted to or from the fulcrum to regulate the rigidity of the hoe.

Instead of having the drag-bar single and located between the arms C, their respective positions can be reversed, as shown in Figs. 5 and 6, Sheet 2, where the drag-bar is in two parallel pieces, pivoted to the outer sides of the brackets $a$ at $b$. In this case the arm C is a single piece, contained between the drag-bars and the brackets, as shown, and the saddle fits over the arm C, and the rod $g$ has lateral studs $n$ resting upon the under edges of the drag-bar, to hold the disk $h$ in position. Or, again, instead of having the slots c in the brackets, they may be in the arms C, as seen in Fig. 7, the pin p being fastened in the brackets. Or, finally, without changing the principle of my device, the drag-bar may be pivoted in the slots c at the lower end of the brackets, and the arms C at the upper end, just reversing the arrangements already described, though operating in substantially the same way.

Should the springs fail or become inoperative while at work, it would only be necessary to disconnect either end of the arms C and place a common brake-pin through one of the holes r in the upper part of the brackets.

Having thus fully described my invention, I claim as follows:

1. A hoe for grain-drills provided on its forward face with brackets a, having segmental slots c, with detaining-shoulders m, in combination with a drag-bar and a compression-arm, substantially as and for the purpose specified.

2. A drag-bar pivoted to a grain-drill hoe, and having its under side notched or serrated, in combination with the stirrup k of the rod g and the compression devices of a spring-hoe, whereby the spring can be shifted at will and held from slipping, substantially as shown.

3. In a spring-hoe for grain-drills or other seeding implements, the spring composed of the saddle D, rubber cylinder E, compression-disk h, and rod g, with its stirrup k, whereby the spring can be shifted to or from the fulcrum d, to regulate the rigidity of the hoe.

4. The saddle-piece D, with a beveled seat, as shown, whereby the spring can rock upon the arms C, and always adjust itself to the position of the compression-arms, substantially as shown.

5. In combination with the drag-bar and hoe, pivoted together, as described, the compression-arms C, pivoted at their forward ends to the drag-bar, and actuated at their rear ends by the circumferential slots c in the brackets a, substantially as and for the purpose specified.

Witness my hand this 17th day of October, A. D. 1877.

E. FOWLER STODDARD.

Witnesses:
   P. H. GUNCKEL,
   WM. RITCHIE.